(12) United States Patent
Doyle et al.

(10) Patent No.: US 7,484,749 B1
(45) Date of Patent: Feb. 3, 2009

(54) FRAME TOW-BAR ADAPTER

(75) Inventors: Chris Doyle, Panama City Beach, FL (US); Steven F. Naud, Lynn Haven, FL (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 332 days.

(21) Appl. No.: 11/417,280

(22) Filed: Apr. 17, 2006

(51) Int. Cl.
*B60D 1/00* (2006.01)

(52) U.S. Cl. ............... 280/460.1; 280/656; 224/401

(58) Field of Classification Search ............ 280/460.1, 280/515, 501, 656, 402; 224/504, 506, 401
See application file for complete search history.

(56) References Cited

U.S. PATENT DOCUMENTS

| | | | | |
|---|---|---|---|---|
| 1,739,716 A | * | 12/1929 | Fisher | 280/78 |
| 2,922,481 A | * | 1/1960 | Ritter et al. | 180/14.6 |
| 3,387,859 A | * | 6/1968 | McClellan | 280/204 |
| 4,078,821 A | * | 3/1978 | Kitterman | 280/460.1 |
| 4,645,230 A | * | 2/1987 | Hammons | 280/656 |
| 5,171,034 A | * | 12/1992 | Scott | 280/204 |
| 5,520,404 A | * | 5/1996 | Schulte | 280/460.1 |
| 5,609,350 A | * | 3/1997 | Chumley et al. | 280/476.1 |
| 5,647,719 A | * | 7/1997 | Bowlen | 414/462 |
| 7,073,816 B1 | * | 7/2006 | Larson et al. | 280/656 |
| 7,258,362 B2 | * | 8/2007 | Thurm | 280/656 |

\* cited by examiner

*Primary Examiner*—Tony H. Winner
(74) *Attorney, Agent, or Firm*—James T. Shepherd

(57) ABSTRACT

A tow-bar adapter for towing a loaded trailer behind a combat vehicle permits opening of a rear ramp door on the vehicle and supporting the open door on the adapter as the vehicle proceeds forward. Longitudinal legs each have first ends provided with a lateral bore axially aligned with each other. Pins extend through each lateral bore and through bosses mounted on the vehicle, allowing rotational movement of the legs about the pins. Cross members extend between and are connected to the legs and a caster assembly is connected to the cross members to provide vertical support for the tow-bar adapter and any carried load. A towing pintle on a cross member connects to a trailer, and the caster assembly rotates about a vertical axis to allow the tow-bar adapter to slew and follow along behind the vehicle as it turns.

12 Claims, 5 Drawing Sheets

FRAME TOW-BAR ADAPTER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to a tow-bar structure between a vehicle having a rear ramp door and a trailer. More particularly, this invention permits rotation of the rear ramp door between a closed position on the vehicle and an open position extending from the vehicle on the adapter during operations in the field.

Advancing military vehicles often tow trailers behind them to transport additional personnel, supplies, ordnance, and various other equipments needed in support of combat operations. Typically the trailers are directly connected to the vehicles via a lunette, (steel ring) on the trailer that engages a vertical post or ring-shaped pintle on the vehicle. While this connection works for many vehicles, it compromises effective utilization of rear ramp-door equipped tracked and wheeled fighting vehicles.

This is because the ramp doors of these fighting vehicles are intended to be completely rotated open to the ground to allow rapid egress of troops from the vehicle in response to a threat. As a result, many rear ramp door-equipped fighting vehicles do not tow trailers and, consequently, the towing capabilities of these vehicles are wasted. The additional items that may be needed for sustained successful operations must either be haphazardly hung from the exterior of the host vehicle, assuming their size permits, or brought along by other support vehicles. Unfortunately, these support vehicles are not normally configured with adequate armor protection to be in direct combat operations and are often separated from the more capable fighting vehicles during hostilities. Thus, the fighting force may not readily have the additional logistic items they may need, when they are critically needed.

Tracked fighting vehicles can be used to tow supply-laden trailers through noncombatant areas, as in convoy operations, for example. For some fighting vehicles, the trailer pintle is so close to the pivot axis of the rear ramp door that the rear ramp must be kept up and closed. This is because the ramp would contact the pintle and be jammed in the partially open position. Rapid troop egress through the rear ramp would again be compromised. Due to this reason, fighting vehicles do not normally employ trailers or even use any aspect of their tow pintle.

In some combat operations, troops may have to be transported considerable distances in the confining space of the closed vehicles and can suffer from claustrophobia, concentrated fumes, and heat fatigue that affect their combat readiness.

Thus, in accordance with this inventive concept, a need has been recognized in the state of the art for a tow bar adapter having a swiveling caster-wheel structure to extend the tow pintle of a combat vehicle sufficiently aft to allow unobstructed usage of the fighting vehicle's rear ramp door while simultaneously allowing towing of various military vehicles. This capability thus maintains the operational capability for the rapid egress of combat troops through the rear ramp of the vehicle while also providing a means to enhance their logistic support by having a trailer-in-tow.

SUMMARY OF THE INVENTION

The present invention provides a tow-bar adapter and method of towing a loaded trailer behind a combat vehicle to permit opening of a rear ramp door on the vehicle and supporting the door in the open position on the tow-bar adapter as the vehicle proceeds forward. The rear ramp door is supported when the vehicle is stationary (i.e. stopped) and/or when the vehicle is maneuvering forward, pivoting or slewing. The tow-bar adapter has a pair of longitudinally extending leg members each having first and second end portions. Each first end portion is provided with a lateral bore axially aligned with each other. A pair of connector pin members is axially aligned as they each extend through a separate lateral bore of a separate end portion to permit vertical rotational movement of the leg members about the connector pin members. Lateral cross members extend between and are connected to the leg members at the second end portions. A high capacity caster-wheel assembly with integral shock-absorbing capability is connected to the cross members at the second end portions to provide vertical support for the leg members, cross members and any carried load. A towing pintle at an aft-most one the cross members allows connection to a towing ring connected to a trailer. A platform member is connected to the leg members at the second end portions of the leg members to carry additional loads. A flat extension portion and a hinge connecting the flat extension portion to the platform member are selectably rotated to extend the surface area of the platform member to provide additional load bearing area. The high capacity off-set angled caster-wheel assembly is coupled beneath and at the second end portions of the leg members and rotates about a vertical or offset axis juncture to follow along (i.e. self-track) in a slewed direction as defined by the towing combat vehicle as it turns.

An object of the invention is to provide a tow-bar adapter to enhance the logistic supportability of a fleet of ground combat vehicles and maneuver forces.

Another object of the invention is to provide a reliable tow-bar adapter for simultaneously allowing unobstructed use of the rear ramp door of a combat vehicle and towing of a trailer by the vehicle.

Another object of the invention is to provide a tow-bar adapter allowing troop-filled vehicles (with rear ramp doors) to take a trailer-in-tow while not interfering with the embarked troop's ability to exit through the rear ramp door.

Another object of the invention is to provide a strong and reliable tow bar adapter that enhances the use of existing trailer systems without impeding mobility of the combat vehicle.

Another object of the invention is to provide a tow-bar adapter allowing for increased critical combat cargo, that can not be readily stowed onto the exterior of the host vehicle, to be concurrently transported with embarked combat personnel.

Another object of the invention is to provide a tow-bar adapter permitting extension of a rear ramp door to an open position to hold, recover, and/or deploy troops and supplies at the door while the combat vehicle is at rest or on-the-move.

Another object of the invention is to provide a tow bar adapter that can utilize the towing capabilities of combat vehicles and eliminate the need for additional support vehicles for towing trailers.

Another object of the invention is to provide a tow bar adapter allowing egress and recovery of troops at the troop compartment of a combat vehicle while on-the-move.

Another object of the invention is to make a tow-bar adapter that relegates the normal stowage of combat gear from the host vehicle to the towed trailer to reduce overall loading of vehicle suspension and troop crowding in the internal compartment of the vehicle.

Another object of the invention is to make a tow-bar adapter that can also act as an integral low-capacity cargo carrier that does not have the adverse maneuvering attributes of a standard trailer-in-tow, such as jack-knifing when backing or sliding laterally on slopes or adverse terrain conditions.

Another object is to provide an adapter also capable of operating successfully behind wheeled vehicles as well as tracked vehicles.

These and other objects of the invention will become more readily apparent from the ensuing specification when taken in conjunction with the appended claims.

DESCRIPTION OF THE PREFERRED EMBODIMENT

Figure 1:
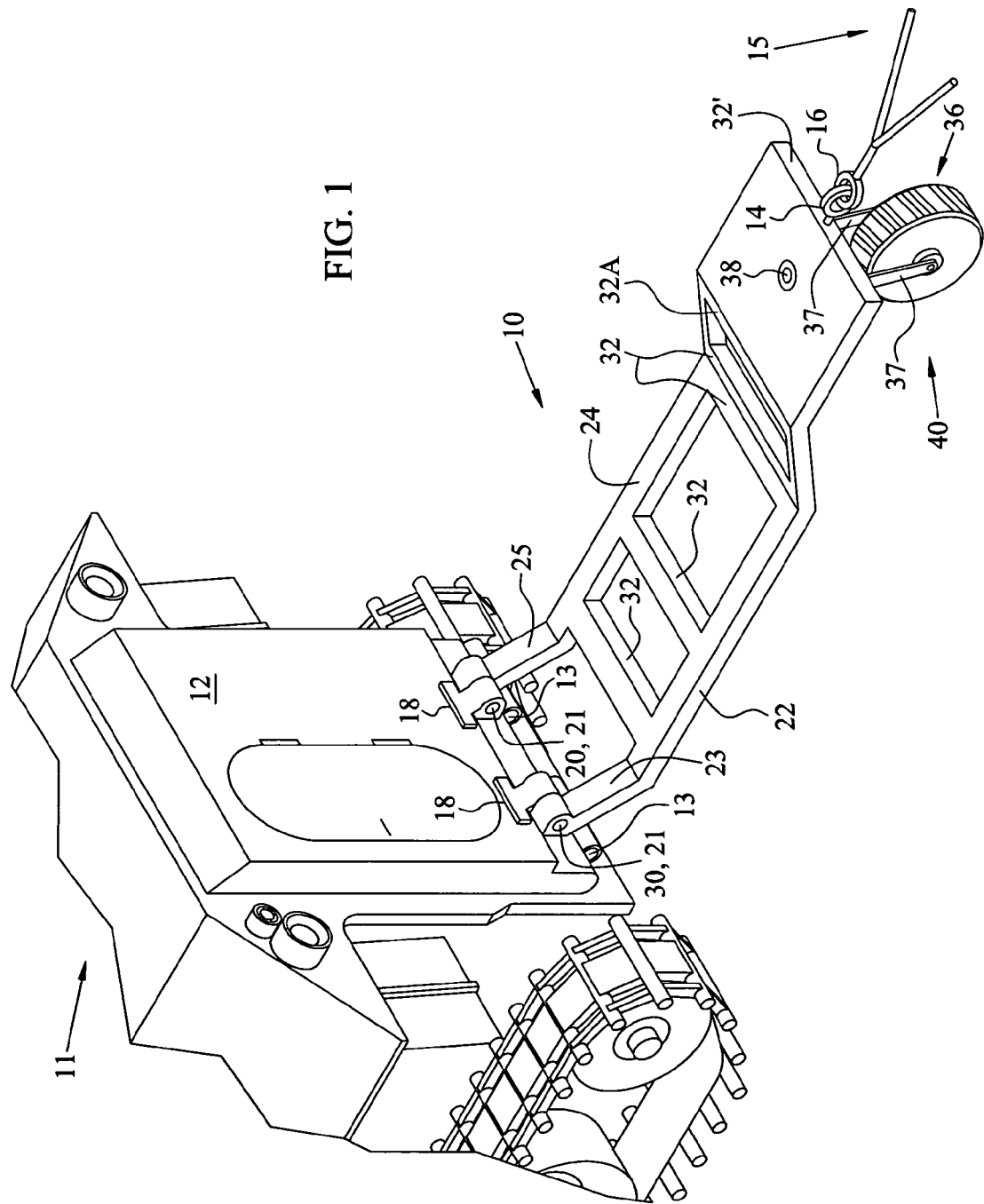
FIG. 1 is an isometric view showing the A-frame tow bar adapter of the invention secured to and being towed by a tracked combat vehicle having its rear ramp door in the closed position.
Figure 3:
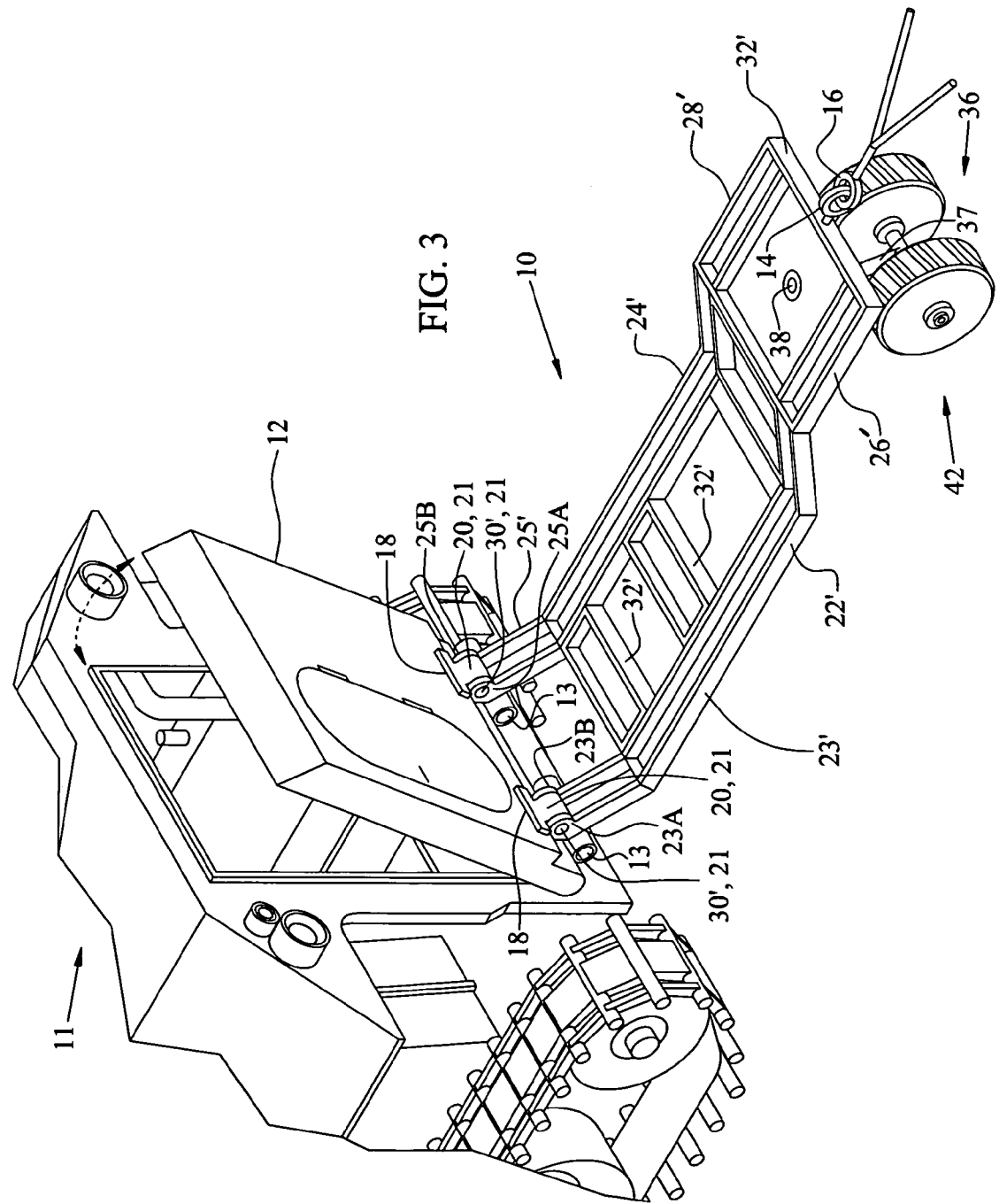
FIG. 3 is an isometric view showing the A-frame tow bar adapter of the invention secured to and being towed by a tracked combat vehicle having its rear ramp door partially rotated open.
Figure 4:
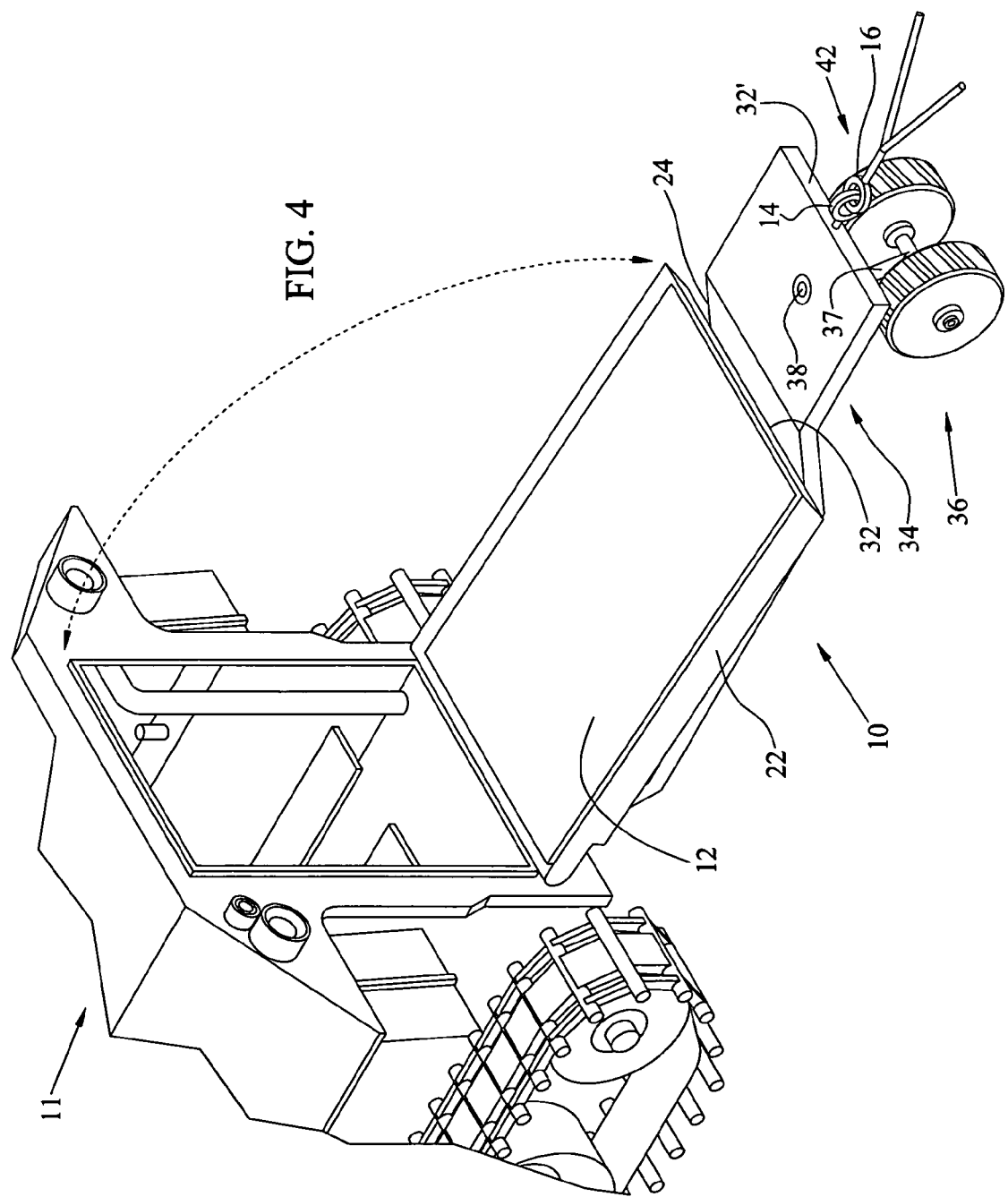
FIG. 4 is an isometric depiction of the combat vehicle and the rear ramp door in the open position and bearing on the A-frame tow-bar adapter.

Referring to FIG. 1, A-frame tow-bar adapter 10 of the invention is connected to a combat vehicle 11 having a stern ramp or rear ramp door 12 connected to combat vehicle 11 by at least one hinge 13. Hinge 13 allows rotation of rear ramp door 12 from a closed position against vehicle 11, as shown in FIG. 1, that protects troops inside from small arms fire and shrapnel, to a partially open position as shown in FIG. 3, and to a fully open position as shown in FIG. 4 that allows unimpeded rapid egress of troops from vehicle 11.

Combat vehicle 11 can be any of several tracked or wheeled troop carrying vehicles. These vehicles can include the Family of Bradley Fighting Vehicles, the Family of Stryker Fighting Vehicles, sometimes referred to as the Family of Light Armored Vehicles (LAV-3), a multitude of varieties of Infantry Fighting Vehicle (IFV) and Infantry Assault Vehicle (IAV), and the Family of M-113 Armored Personnel Carriers (APCs) including the U.S. Marine Corps Amphibious Assault Vehicle (AAV).

A-frame tow-bar adapter 10 of the invention has a post or standard towing pintle 14 that allows combat vehicle 11 to tow a trailer 15 having a mating lunette or standard steel ring 16 engaging tow pintle 14. This capability gives the troops embarked in vehicle 11 their own inseparable, organic logistic train during rapidly changing tactical situations. This logistic train is carried on attached trailer 15 and can include supplies, ordnance, fuel, and other things necessary to sustain prolonged operations, and trailer 15, interconnected to vehicle 11 by tow-bar adapter 10, does not hinder the rapid egress of combat personnel through rear ramp door 12.

Figure 2:
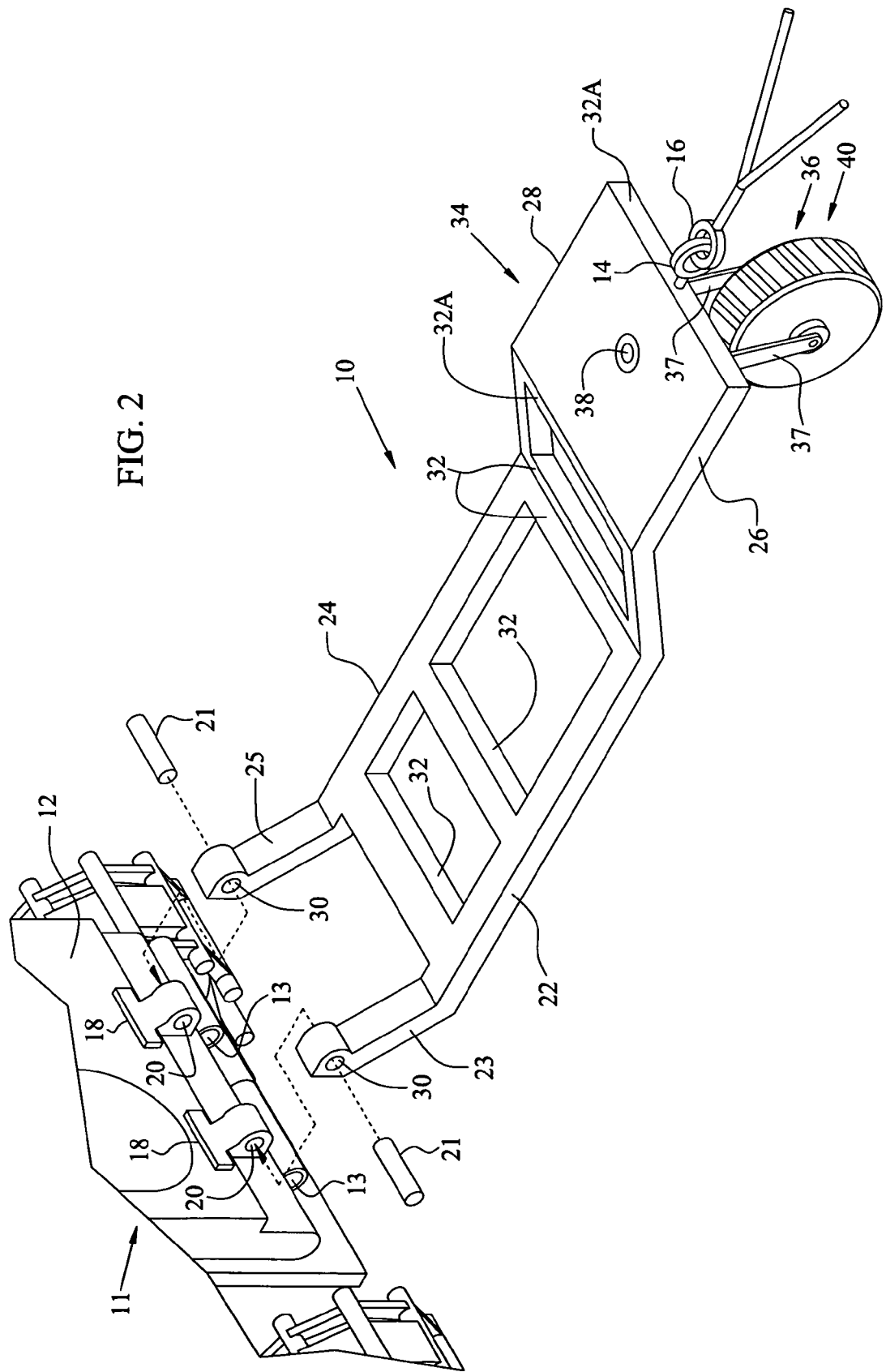
FIG. 2 is an isometric view of the A-frame tow-bar adapter of the invention separated from the combat vehicle to show details of mating parts for connection to the towing vehicle.

Referring also to FIG. 2, combat vehicle 11 has a pair of bosses 18 welded on it, on hinges 13, or on rear ramp door 12, the latter being shown. Each boss 18 has a laterally extending bore 20 sized to receive a connector pin 21, and both bores 20 are axially aligned with one another. A-frame tow-bar adapter 10 is adapted to be connected to towing combat vehicle 11 via pins 21 inserted in aligned bores 20 of bosses 18.

A-frame tow-bar adapter 10 has two longitudinally extending leg members 22 and 24 each respectively having a first end portion 23 and 25 at first ends and second end portions 26 and 28 at opposite second ends. Each first end portion 23 and 25 has a lateral bore 30 that is the same diameter as bores 20 in bosses 18 to receive connector pins 21. Several laterally extending cross members 32 extend between and are connected to leg members 22 and 24. An optional, essentially rectangular, platform member 34 can extend across and be connected to leg members 22 and 24 at opposite second end portions 26 and 28 and onto one or more of cross members 32 including an aft-most cross member 32A. Leg members 22 and 24 with their first and second end portions 23, 25, 26, and 28, cross members 32, and platform member 34 can be made of steel or other high strength material and have a robust solid cross-sectional shape to bear the loads expected on tow-bar adapter 10. Platform member 34 and/or aft-most cross member 32A can be reinforced to bear the towing load of the interconnected towing pintle 14. Members 22, 24, 32, 32A and 34 can be welded, bolted or otherwise suitably secured to one another to withstand the stresses and strains encountered as tow-bar adapted 10 pulls trailer 15 behind combat vehicle 11.

Platform member 34 and/or one or more of cross members 32 of tow-bar adapter 10 including aft-most cross member 32A has an off-set, high-capacity swiveling caster-wheel assembly 36 connected to it via one or more supporting struts 37 to define a leading vertical axial juncture 38. Caster-wheel assembly 36 can have a single wheel 40 as shown in FIGS. 1 and 2 or a pair of juxtaposed wheels 42 as shown in FIGS. 3 and 4. Caster wheel assembly 36, whether constructed of a single wheel, FIGS. 1 and 2, or constructed of juxtaposed wheels, FIGS. 3 and 4, will preferably have a shock absorbing feature incorporated into its axle in order to enhance the wheels' ability to maintain wheel-to-ground contact and damper dynamic impacts. The shock absorbing feature is not shown in the drawings. Caster wheel assembly 36 also could be other dual tandem wheel or tracked structures including mini-track drive assemblies or rubber-belt drive assemblies that may also be connected to a power takeoff from vehicle 11 to negotiate sand and other soft terrain, for examples. However, irrespective of the configuration of the caster wheel assembly 36, caster wheel assembly 36 coupled to axial juncture 38 by struts 37 must operate like a caster wheel that swivels to align with and follow the direction that it is being pulled or led. Caster-wheel assembly 36 provides vertical support for the weight of rear ramp door 12, the weight of personnel and equipment on door 12 when it is rotated to the open position on tow-bar adapter 10, and the tongue weight of trailer 15. Caster wheel assembly 36 provides vertical support to the elements identified above whether the vehicle is stationary or moving.

Tow-bar adapter 10 is connected to vehicle 11 by bringing first end portions 23 and 25 of leg members 22 and 24 next to bosses 18 at the rear of vehicle 12. Bores 30 in end portions 23 and 25 are placed adjacent to bores 20 in bosses 18 on vehicle 11 and axially aligned with bores 20. Cross members 32 of tow-bar adapter 10 are made to have the right length to space both bores 30 of first end portions 23 and 25 next to and laterally inside or laterally outside of bores 20 in bosses 18.

This arrangement of end portions 23 and 25 with respect to bosses 18 keeps the tow-bar adapter 10 at a constant orientation behind the rear of the host vehicle 11, thus causing the tow-bar adapter 10 to slew with the host vehicle 11. When end portions 23 and 25 are so located next to bosses 18, connector pins 21 are inserted through the aligned pairs of bores 20 and 30 to securely connect longitudinally extending leg members 22 and 24 of tow-bar adapter 10 to bosses 18 of vehicle 11. Spring-like retainers (not shown) or other known retaining means can be provided on pins 21 to hold them in aligned bores 20 and 30.

With the secure connection of connecter pins 21 between leg members 22 and 24 of tow-bar adapter 10 and bosses 18 of vehicle 11, tow-bar adapter 10 is capable of only one axis of vertical rotation where tow-bar adapter 10 is attached to combat vehicle 11 and is restricted from independent lateral rotation with respect to vehicle 11. Consequently, when vehicle 11 commences to negotiate a turn, tow-bar adapter 10 will act as if it is an extension of the main hull of vehicle 11 and will slew with vehicle 11.

Caster-wheel assembly 36 will rotate about vertical axis juncture 38 and follow along in the slewed direction as defined by vehicle 11 as it turns. While following the turn, caster-wheel assembly 36 vertically supports or bears the load created by tow-bar adapter 10, the tongue weight of an interconnected loaded trailer 15, and the weight of rear ramp door 12 and any troops or supplies on it when rear ramp door 12 is open and resting or bearing on tow-bar adapter 10. Because tow-bar adapter 10 having caster-wheel assembly 36 is mounted on vehicle 11 to permit rotation at vehicle 11, tow-bar adapter 10 can responsively articulate and follow vehicle 11 as it, and an attached trailer 15, negotiate hills and proceed across other irregular features of terrain.

A variety of cross-sectional shapes can be selected for members 22, 24, 32, and 34 in tow-bar adapter 10 such as I-beam, U-beam, honeycomb, etc. For example, FIG. 3 shows U-shaped side members 22' and 24' with first and second end portions 23', 25', 26' and 28'. Each of the first end portions 23' and 25' have aligned bores 30' in both sides of U-shaped members 22' and 24'. Bores 30' with pins 21 are shown in the near side 23A and 25A of each of end portions 23' and 25' in FIG. 3. It is understood that other aligned bores 30' each containing a pin 21 are in the far side 23B and 25B of each of end portions 23' and 25'. Cross members 32' are the right length to position U-shaped members 22' and 24' so that their near and far sides 23A and 25B of end portion 23' and near and far sides 25A and 25B of end portion 25' straddle or sandwich bosses 18 on vehicle 11 to prevent lateral motion of tow-bar adapter 10.

Referring to FIG. 3, tow-bar adapter 10 will permit partial rotation and partial opening of rear ramp door 12. Partial opening may be useful to relieve the stress of troops subjected to close confinement over a prolonged period of time or to air-out vehicle 11. Tow-bar adapter 10 can still effectively pull trailer 15 and its load of goods behind, and when vehicle 11 is traveling at a safe speed, troops can egress or supplies can be dispensed or distributed along the way as needed during different missions.

FIG. 4 shows rear ramp door 12 rotated to the fully open position while it rests or bears on longitudinally extending leg members 22 and 24 of tow-bar adapter 10. Now, armed troops at the ready can be carried on fully open rear ramp door 12 to speed deployment and/or more supplies can be stacked on the open ramp door 12 as needed. Optionally and referring to FIG. 5, the surface area of platform member 34 of tow-bar adapter 10 can be extended to accommodate larger containers of goods by rotating a flat extension portion 44 about a hinge 46 from its normally stowed location on platform member 34. Extension portion 44 can be rotated about hinge 46 either way (as shown by the arced two-way arrow) to provide additional flat load bearing area beyond the extent needed by a variation of rear ramp door 12' as shown in phantom, opened to its open position on a variation of tow-bar adapter 10'. Portion 44 could rest directly on part of longitudinally extending legs 22 and 24 or on the slightly bent legs 22A and 24A. Where rear ramp door 12' and adapter 10' are combined as shown in FIG. 5, a laterally extending, weight-bearing elongate block 48 may be inserted between extension portion 44 and longitudinally extending legs 22A and 24A.

The loads on and mass of rear ramp door 12 in all variations of tow-bar adapter 10 and the tongue weight of trailer 15 will be borne by caster-wheel assembly 36 as it responsively trails and slews behind maneuvering combat vehicle 11. Caster-wheel assembly 36 is depicted in FIG. 5 as being attached to its vertical axis juncture 38 at platform member 34 that may or may not be reinforced with an internal rearmost cross member 32A.

Figure 5:
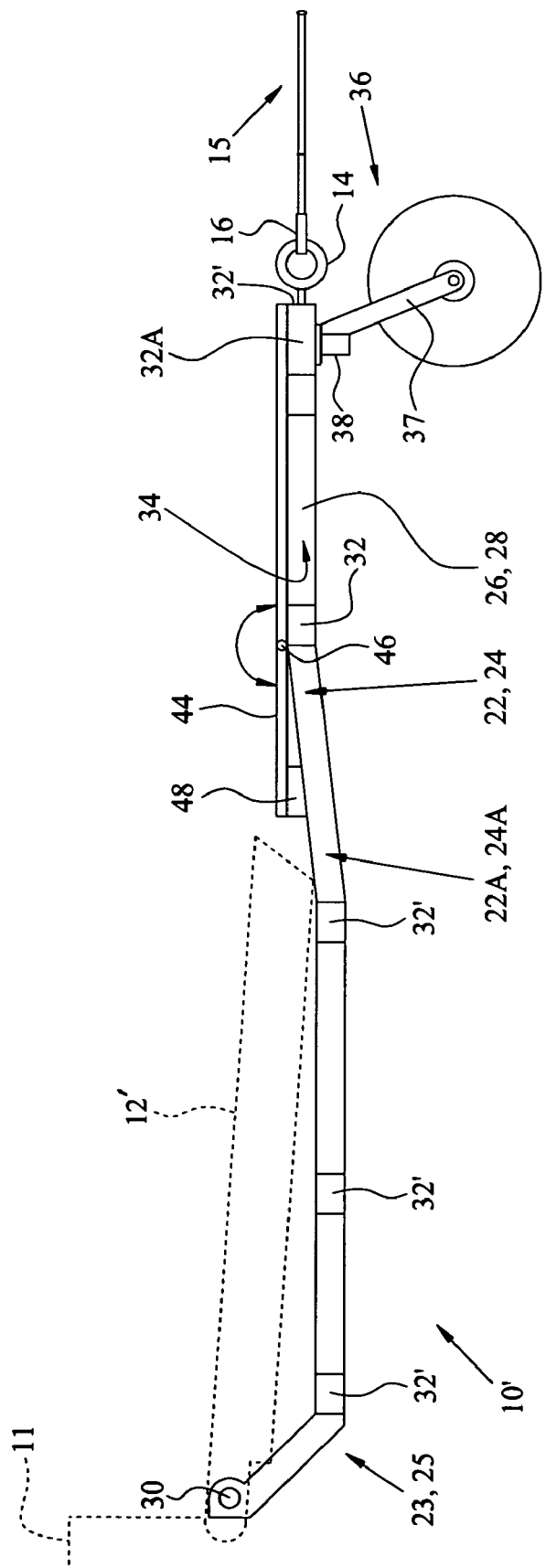
FIG. 5 is a side view showing details of a variation of the A-frame tow-bar adapter of the invention.

Optionally, the overall length of the tow-bar adapter 10 can be selected such that the surface area of platform member 34 can be large (as depicted in FIG. 5) or it can be very short, or even eliminated entirely, thereby shortening the tow-bar adapter 10 to its smallest practical size.

In the full open position of rear ramp door 12 or 12' on tow-bar adapter 10 or 10' as respectively depicted in FIGS. 4 and 5, troops can rapidly egress unobstructed from the confines of combat vehicle 11 as needed while combat vehicle 11 continues to proceed forward at a safe speed. Unlike other contemporary vehicles, there is no need for combat vehicle 11 equipped with tow-bar adapter 10 to completely stop, drop rear ramp door 12 to the ground and present a clear stationary target while troops are being deployed. Unlike other contemporary vehicles, there is no need for combat vehicle 11 equipped with tow-bar adapter 10 to pass through areas buttoned-up and vulnerable since percipient armed troops on board could thwart aggressive moves. Some troops from combat vehicle 11 can take positions along opposite sides of opened rear ramp door 12 as it rests on tow-bar adapter 10 and keep such areas under increased surveillance as combat vehicle 11 proceeds forward.

Having the teachings of this invention in mind, modifications and alternate embodiments of tow-bar adapter 10 may be made. Differently configured members could be used in the construction of tow-bar adapter 10 or all members could be an integral cast or otherwise machined unitized structure. Modified designs using sophisticated composite materials for tow-bar adapter 10 can be readily created within the scope of the present invention by one having ordinary skill in the art. In addition to the uncomplicated, highly functional unit described, tow-bar adapter 10 could have different shapes and different sizes to assure positive interconnection with other structures for use under different operational conditions.

The disclosed components and their arrangements as disclosed herein all contribute to the novel features of this invention. Tow-bar adapter 10 is a rugged, functional means for assuring interconnection of a towed trailer 15 to a combat vehicle 11 that increases the effectiveness or combat capability of combat vehicle 11 and its embarked troops and assures the rapid unobstructed egress of those troops during threatening emergencies. Therefore, the tow-bar adapter 10 and variants disclosed herein are not to be construed as limiting, but rather, are intended to be demonstrative of this inventive concept.

It should be readily understood that many modifications and variations of the present invention are possible within the purview of the claimed invention. It is to be understood that within the scope of the appended claims the invention may be practiced otherwise than as specifically described.

We claim:

1. A tow-bar adapter for a combat vehicle and trailer permitting opening of a rear ramp door on the vehicle comprising:
    a pair of bosses configured to be mounted on the rear of the combat vehicle, each said boss having a lateral bore axially aligned with the bore in the other said boss;
    a pair of longitudinally extending leg members each having first and second end portions, said longitudinally extending leg members being shaped to define an upwardly facing cavity sized and positioned to receive the rear ramp door rotated to the fully open position therein to provide vertical support therefor, each first end portion having a lateral bore axially aligned with the bore in the other said first end portion and said lateral bores in said bosses;
    a pair of connector pin members axially aligned with each other and each extending through a lateral bore in one of said first end portions and a corresponding lateral bore in one of said bosses;
    a plurality of lateral cross members extending between and connected to said leg members including said second end portions, said lateral cross members sized to hold each of said first end portions adjacent to a corresponding one of said bosses;
    a caster-wheel assembly connected to one of said cross members at said second end portions, said caster-wheel assembly being off-set to rotate about a vertical axis juncture and providing vertical support for said leg members, said cross members and any load carried thereon; and
    a towing pintle mounted on and extending from the aft-most one of said cross members, said towing pintle configured to be connected to a towing ring on the trailer.

2. The tow-bar adapter of claim 1 further comprising:
    a platform member, configured to carry a load, connected to said leg members at said second end portions, said platform member having an upper surface being in substantially the same plane as the upper surface of the rear ramp door rotated to the fully open position.

3. The tow-bar adapter of claim 2 further comprising:
    a flat extension portion; and
    a hinge connecting said flat extension portion to said platform member; said flat extension portion being selectably rotated to extend the surface area of said platform member to provide additional load bearing area, said additional load bearing area of said rotated flat extension portion being in substantially the same plane as the upper surface of the rear ramp door rotated to the fully open position.

4. The tow-bar adapter of claim 2 wherein said caster-wheel assembly is coupled to said platform member.

5. The tow-bar adapter of claim 1 wherein said caster-wheel assembly includes a single wheel.

6. The tow-bar adapter of claim 1 wherein said caster-wheel assembly includes dual wheels.

7. A method of towing a trailer behind a combat vehicle and permitting opening of a rear ramp door comprising the steps of:
    providing a combat vehicle having a rear ramp door for rotating from a closed position on the back of the vehicle to an open position extended from the vehicle;
    mounting a pair of spaced apart bosses on the back of said vehicle, each of said bosses having a bore being axially in-line with the other said boss;
    providing a tow-bar adapter having a towing pintle at one end for connection to a trailer and having a pair of aligned bores at the other end;
    supporting said tow-bar adapter on a caster-wheel assembly;
    placing said aligned bores in said tow-bar adapter adjacent to said bosses;
    rotatably coupling said tow-bar adapter to said bosses on said vehicle;
    longitudinally extending said tow-bar adapter to permit said rotation of said rear ramp door to said open position; and
    bearing said rear ramp door in said open position on said tow-bar adapter.

8. The method of claim 7 wherein said step of placing includes said step of:
    aligning said pair of bores in said tow-bar adapter with said bores in said bosses.

9. A method of claim 7 wherein said step of rotatably coupling further comprises the step of:
    inserting connector pin members through said bores in said bosses and said tow-bar adapter.

10. The method of claim 7, further comprising the step of connecting a trailer to said towing pintle.

11. The method of claim 7, further comprising the step of providing a platform member capable of carrying a load on said tow-bar adapter where said platform member will not be in the way of said rear ramp door in said open position.

12. The method of claim 11, further comprising the step of placing a load on said platform member.

* * * * *